Jan. 16, 1923. 1,442,144.
L. P. HALLADAY.
SPRING BUMPER.
FILED FEB. 1, 1922.
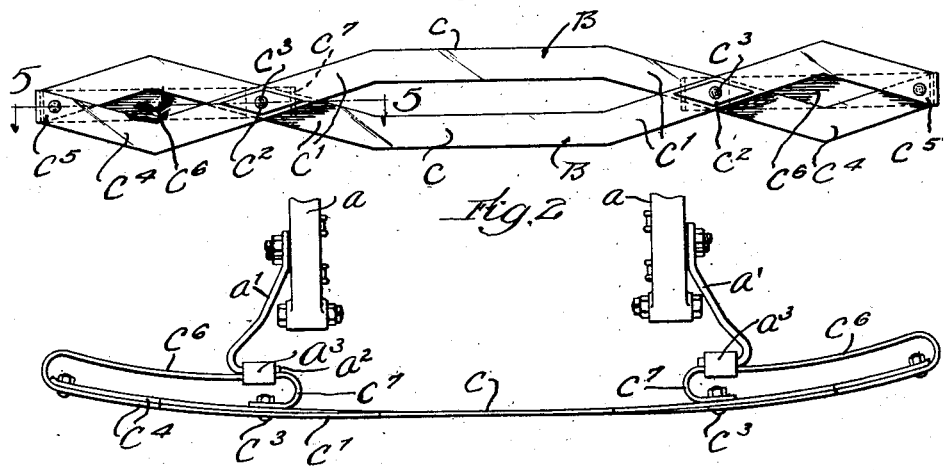
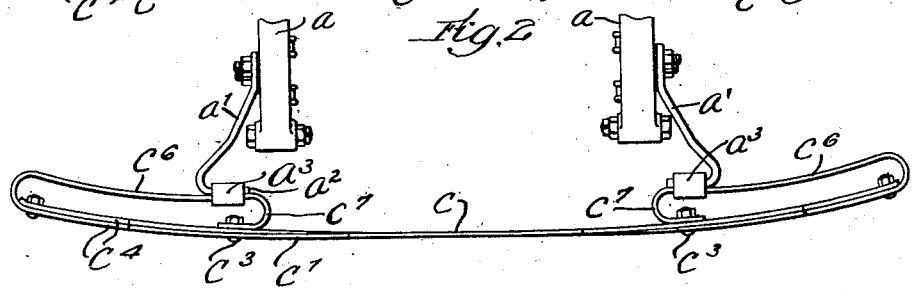
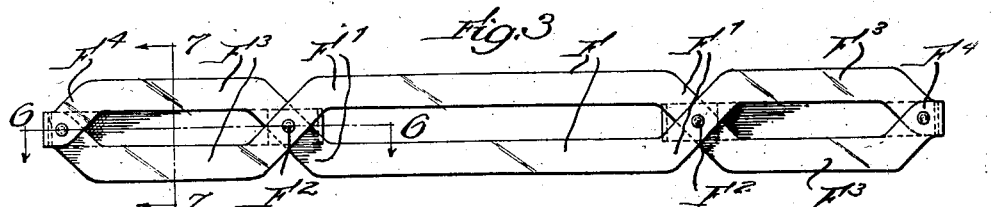
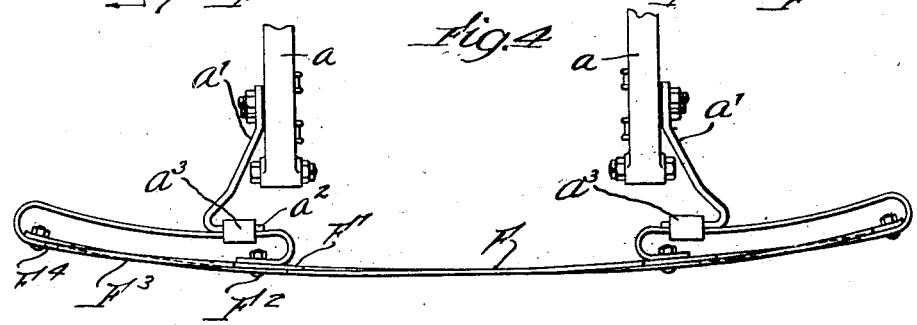
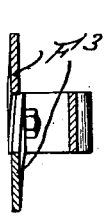
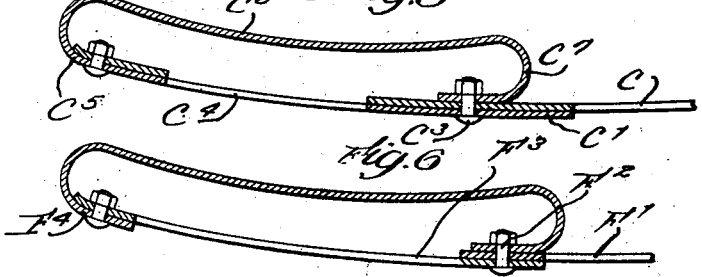
Inventor
Lewis P. Halladay
By Parker & Carter attys.

Patented Jan. 16, 1923.

1,442,144

UNITED STATES PATENT OFFICE.

LEWIS P. HALLADAY, OF DECATUR, ILLINOIS.

SPRING BUMPER.

Application filed February 1, 1922. Serial No. 533,195.

*To all whom it may concern:*

Be it known that I, LEWIS P. HALLADAY, a citizen of the United States, residing at Decatur, in the county of Macon and State of Illinois, have invented a certain new and useful Improvement in Spring Bumpers, of which the following is a specification.

My invention relates to improvements in automobile bumper bars of the type wherein there are, for a part of the length of the bumper bar at least, two vertically disposed surfaces, providing therefor in effect a vertically extended spring impact surface.

One object of my invention is to provide a duplex automobile bumper bar with two vertically disposed surfaces forming a plurality of vertically extending impact surfaces across the front of the automobile, preferably comprising a central elongated surface and smaller extended surfaces at each side thereof and in front of and protecting the wheel.

My invention is illustrated more or less diagrammatically in the accompanying drawings, wherein—

Fig. 1 is a front elevation;

Fig. 2 is a plan view of Fig. 1;

Fig. 3 is a front elevation of a slightly different form;

Fig. 4 is a plan view of Fig. 3;

Fig. 5 is a section on the line 5—5 of Fig. 1;

Fig. 6 is a section on the line 6—6 of Fig. 3;

Fig. 7 is a section on the line 7—7 of Fig. 3.

Like parts are indicated by like characters throughout the drawings.

A A are the front frame horns of an automobile frame. $A^1$ $A^1$ are bumper support ing brackets attached to said horns. $A^2$ $A^2$ are bumper-supporting bars projecting from the brackets. $A^3$ $A^3$ are bumper bars supporting yokes carried upon said arms, adapted to engage the rear member of a spring bumper bar and hold it in place.

B B are spring bumper bar elements. It will be noted that they are exactly the same in size, shape and dimensions, so that when the two of them are reversed in respect to one another they may be put together to form the bumper bar herein shown.

Each of these spring elements is made up of a generally flat with slightly rearwardly curved front member C, of such length as to extend throughout about one-fourth of the total width. At either end of the central section is an inclined section $C^1$, these inclined sections of these two members crossing, as at $C^2$, to form a diamond-shaped intersecting portion. They may be secured together at that point as by the bolt $C^3$. The outer ends of the inclined portions are again continued by oppositely inclined portions $C^4$, which meet at the outer extremities $C^5$ of the bar. At each end of the bumper one of the bars is rearwardly curved or looped and provided with an inwardly extending rear element $C^6$, extending back about one-third the way across the end of the bumper and terminating in a secondary loop or recurved element $C^7$, which terminates at the same place and in line with the intersection $C^2$, at which point it is secured to both the main bumper members. It is upon this recurved loop that the clamps $A^3$ are mounted for lateral adjustment to compensate for vehicle frames of various widths. The two bumper elements are crossed, as shown in Fig. 2, so that at one intersection, $C^2$, the upper bumper lies in front of the lower and at the other intersection the lower lies in front of the upper, the same reversed relation holding true, of course, at the ends of the bar.

In Figs. 3 and 4 a variant form is shown, consisting of two identical spring bumper bar elements, each comprising a central horizontal portion F connected by inclined portions $F^1$ joined as at $F^2$. The smaller extended surfaces at the side are formed with horizontal upper and lower members, continuations of the bar elements, as at $F^3$ $F^3$, these again converging at their ends as at $F^4$ $F^4$. At the crossing points $F^2$ $F^2$ the upper bumper bar is in front in the crossing to the left of Fig. 3 and the lower one is in front in the crossing to the right of Fig. 3. At each end of the bumper one of the bars is rearwardly curved or looped, as in the case of the other form.

It will be realized that while I have illustrated bumper bars and bumper bar elements which are practical and have actually been constructed, many changes might be made in the form and proportion of these bars and the relation of their various parts, and in the means by which they are secured to each other and to the automobile frame, without departing from the spirit of my invention.

The use and operation of my invention are as follows:

The arrangement is such that the two spring loops at either end afford a yielding or flexible support for the central, laterally disposed section of the bumper bar and for the enlarged end portions, the idea being that any shock or blow upon the central or end portions will be absorbed both by the spring of the bumper bar itself and by the in general greater resilience of the reinforcing and supporting loop members.

The straight supporting bars are made of flat pieces of steel, looped at their ends, but these loops are of such radius and so heavy and stiff that they have no spring function, and in any case the shock is absorbed by the bumper bar before these arms can act as springs. As above described, the arms are intertwined and bolted together at their ends and at two intermediate points. This interlocking produces a peculiarly rigid and durable structure and prevents any separation or disassociation of the parts, even under sudden distortion.

The arrangement is peculiarly advantageous in that three enlarged, protecting areas are provided, one in the center of the bar and another at each end in front of the wheel. The diamond-shaped end panels of the bar, furthermore, insure a tapered end for the bar, which is distinctly advantageous over a round or a square end, since the tapered point is not so liable to catch onto or hook into fenders of other cars or catch on other articles with which it may come in contact.

The form shown in Figs. 3 and 4 provides a similar bearing surface before each wheel, and over an even larger area, but also provides a more or less tapered bumper end.

I claim:

1. A bumper bar comprising a plurality of spring elements lying in roughly the same vertical plane and offset from each other to form a plurality of diamond-shaped impact surfaces having an elongated parallel-sided impact surface therebetween.

2. A bumper bar comprising a plurality of spring elements offset from each other to form a plurality of widened impact portions and brought together at the ends to form tapered end impact surfaces.

3. A bumper bar comprising a plurality of spring elements lying in roughly the same vertical plane and offset from each other to form a plurality of diamond-shaped impact surfaces, one of said elements being rearwardly curved at each end of said bar, and means for securing it to a vehicle.

4. A bumper bar comprising a plurality of spring elements lying in roughly the same vertical plane and offset from each other to form a plurality of diamond-shaped impact surfaces, the end of one of said spring elements at each end of the bumper bar being rearwardly curved to form a closed loop, and means for securing such loop to the vehicle.

5. A bumper bar comprising a plurality of interlaced spring elements each comprising in part a horizontal portion and a plurality of straight portions inclined thereto, the end of one of said spring elements at each end of the bumper bar being rearwardly curved to form a closed loop, and means for securing such loop to the vehicle.

6. A bumper bar comprising a plurality of zigzag spring elements lying in roughly the same vertical plane and adapted to intersect and be secured to each other at a plurality of points, the end of one of said spring elements at each end of the bumper bar being rearwardly curved to form a closed loop, and means for securing such loop to the vehicle.

7. A bumper bar comprising a plurality of spring elements lying in roughly the same vertical plane and offset from each other to form a plurality of inclined ended impact surfaces, the end of one of spring elements at each end of the bumper bar being rearwardly curved, and means for securing it to the vehicle.

8. A bumper bar comprising a plurality of spring elements lying in roughly the same vertical plane and offset from each other to form a plurality of inclined ended impact surfaces, one of said surfaces forming a long central impact member, and one of the shorter surfaces at each end of the bar being aligned in front of the wheels.

Signed at Chicago, county of Cook, and State of Illinois, this 30th day of January, 1922.

LEWIS P. HALLADAY.